Patented Dec. 23, 1952

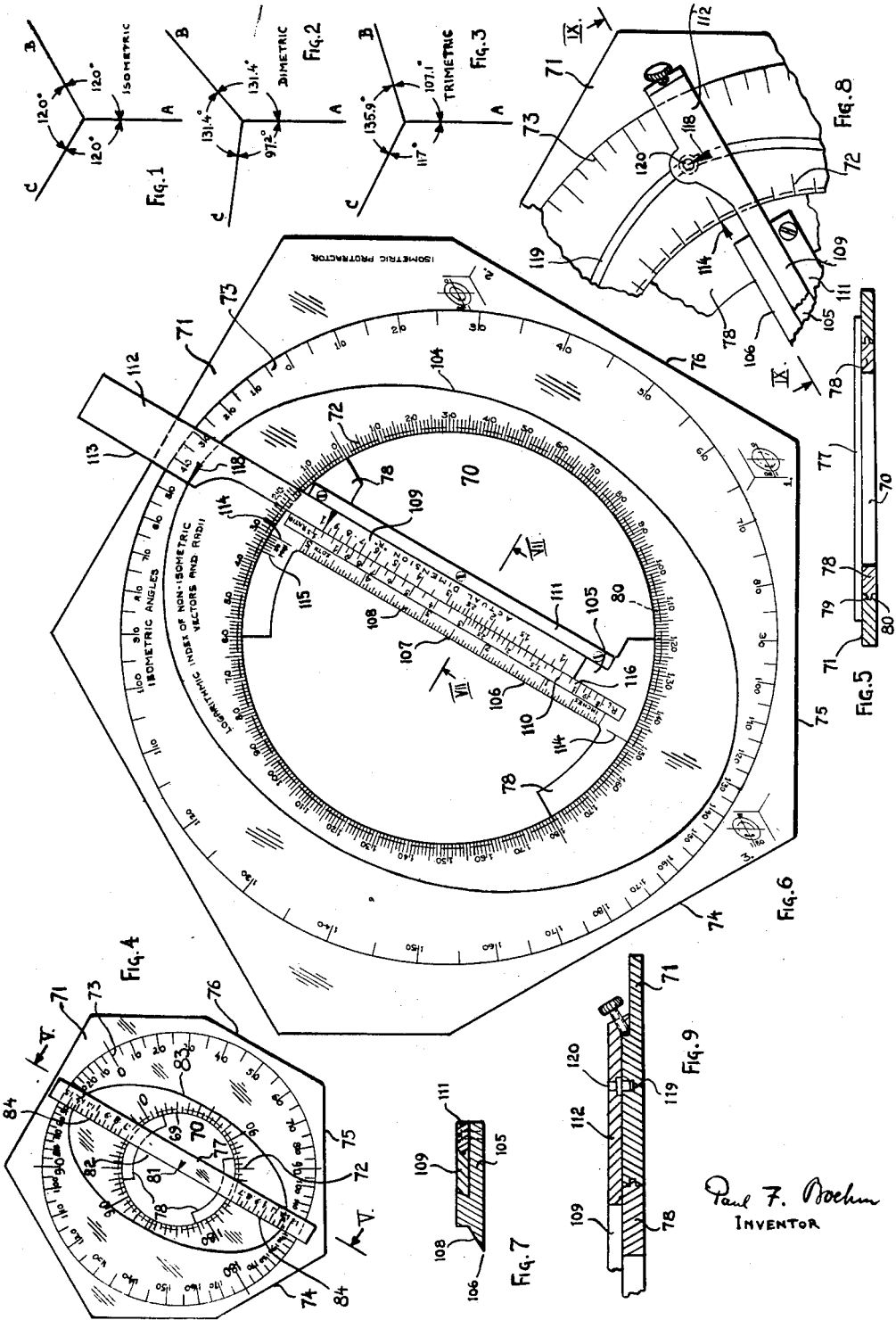

2,622,326

UNITED STATES PATENT OFFICE 2,622,326

PROTRACTOR

Paul F. Boehm, Greenwich, Conn., assignor to John R. Cassell Co., Incorporated, New York, N. Y., a corporation of New York Application December 10, 1945, Serial No. 633,987

3 Claims. (Cl. 33—1)

The present invention refers to protractors, and more specifically to protractors adapted to be used in connection with axonometric drawings.

It is one object of this invention to provide a protractor which enables the user to gauge and to plot angles directly in the magnitudes which apply to the various projections occurring in axonometric drawings where dimensions as well as angles of the original object represented are distorted or modified due to said projection.

It is another object of this invention to provide an axonometric protractor which through its shape and the arrangement of the reference or zero lines of the angular graduation or graduations facilitates its use due to the fact that a correct position of the protractor with respect to the axes of the particular axonometric drawing is automatically obtained.

A further object of the invention consists in providing on one protractor both a regular angular graduation and one or more axonometric or modified graduations so that the modified angle required to represent in the axonometric drawing a certain angle occurring on the represented object may be read directly from the protractor, and vice versa.

Still a further object of this invention is to provide an axonometric protractor which is provided with means permitting to gauge and plot so-called "non-axonometric" lines in correct length that may be foreshortened or lengthened with respect to the length of the original line on the represented object, depending upon the angle which that particular line includes with one of the axes of the particular axonometric system.

Another object of the invention consists in devising an axonometric protractor of the type described in the preceding paragraph but provided with means that would permit to use the protractor independently of the actual drawing as a computing device similarly as a slide rule for converting actual angles into the corresponding modified or projected angles, and vice versa, and for converting actual dimensions into the corresponding modified or projected dimensions, and vice versa.

More objects of the present invention will become evident from the following description, by way of example, of a number of preferred embodiments of the invention, reference being had to the accompanying drawings in which Figs. 1, 2 and 3 are diagrams intended to illustrate the specific features of axonometric systems referred to in this description, and more particularly those of isometric, dimetric and trimetric systems, respectively;

Fig. 4 is a plan view of a full circle protractor provided with an isometric graduation and a rotatable indexing member in a polygonal frame, but in addition provided with an index curve on the frame, and with a special graduation on the indexing member permitting to determine the ratio of foreshortening or lengthening of actual dimensions in consequence of the isometric projection, depending upon the angular direction of the particular dimension;

Fig. 5 is a vertical cross section, not to scale, taken along line V—V of Fig. 4.

Fig. 6 is a plan view of another version of a protractor as shown by Fig. 4, the index curve being constructed on the basis of logarithmic values representing the above mentioned ratios, and the indexing member being provided also with a slide rule arrangement;

Fig. 7 is a vertical cross-section through the rotatable index member along line VII—VII of Fig. 6.

Fig. 8 is a fragmentary plan view and Fig. 9 is a corresponding cross-sectional elevation showing a modification of the construction illustrated by Figs. 6 and 7.

In the following description isometric, dimetric and trimetric systems and drawings are referred to. In order to avoid misunderstandings and to shorten the explanations, the following statements and definitions are to be applied to this specification and to the claims.

As Fig. 1 implies, in an isometric drawing or system the three axes A, B and C are offset against each other equally by 120° each and therefore the scales applying to each of these axes are equal to each other and so are the angles of projection that apply to the planes contained between each pair of axes.

In a dimetric system or drawing as symbolized by Fig. 2, only two of the angles between the axes are equal. In the present case the actual angles between the axes and the corresponding angles of projection have been chosen in such a way that the scales along the axes A and C are equal and twice as large as the scale applied to axis B.

In a trimetric system or drawing the angles between the three axes are different from each other and so are the angles of projection and the scales applying to the three axes. The angles between the axes A, B and C shown in Fig. 3 are calculated on the permissible assumption that the scales are: 1:1 on axis A, .9:1 on axis B, and .75:1 on axis C.

The various graduations shown in the drawings are based on the above, but may be varied in the dimetric and trimetric systems as they are given only by way of example.

It is well known that in axonometric systems when the angles between the three axes are determined there is still room for different arrangements of these axes with regard to each other and in relation to the actual drawing. For instance, any one of the three axes may be arranged in vertical direction on the drawing and the sequence or consecutive order of the axes A, B, C may be clockwise or anti-clockwise, whatever the particular case may call for. Only for simplifying the matter, in the following description and in the drawings uniformly that case has been elected in which the axis A is vertical and the consecutive order of A, B and C is anti-clockwise.

Since any embodiment of this invention requires a solid body or frame adapted to be used on a drawing board like any other drawing instrument, repeatedly certain edges of such a frame are referred to. The term "edges" is not to be taken literally. If in the particular case that "edge" is used only for lining up or positioning the instrument on the drawing either by lining up the "edge" with a given line of the drawing or with an edge of another drawing instrument as for instance T-squares, straight-edges, triangles or blades of drafting machines then other means that are not exactly an edge would be equivalent. For instance a line or a number of points in straight alignment marked on a frame inside its contour would serve the same purpose. Or for instance, the edge of the instrument might be notched out and may have only a number of projections that may be placed against a straightedge or the like so that the imaginary line connecting these projections would serve for positioning the instrument and therefore would be again equivalent to a real edge.

Figs. 4 to 9 illustrate a number of embodiments of this invention which have the common feature that the protractors are provided with a rotatable index member or arm which is adapted to be set arbitrarily with respect to the angular graduations in such a way that in any chosen position an edge or index line of that rotatable member indicates a chosen angle against the center-zero line of the particular instrument. Although the addition of a rotary member makes the instrument more expensive it certainly is of great advantage as angular lines can be drawn directly along the proper edge of that rotatable member while in any other case a point opposite one particular graduation mark would have to be marked on the paper and then connected separately with the particular central point.

Moreover, the protractors illustrated by Figs. 4 to 9 have the common feature of the frame being more or less polygonal or at least having edges that run at certain angles against the center-zero line of the particular graduations. This provision is of advantage because thereby the frame of the instrument can be very conveniently positioned so that the particular center-zero line is parallel with one of the axes of the pertaining plane of the particular axonometric projection.

The protractor according to Fig. 4 contains along the edge 69 of a circular opening 70 in a polygonal frame 71, a regular 360° graduation 72 and a concentric isometric graduation 73. Both graduations are composed of two 180° graduations, one of them running clockwise and the other one anti-clockwise, the center-zero line being common to all of them. The lower part of the polygonal frame 71 has three edges 74, 75 and 76, each being at 120° relative to the adjoining edge. The center-zero line of the graduations is at 30° relative to the base edge 75. Therefore, by placing any one of the edges 74, 75 or 76 against a T-square the center-zero line and the 90° mark of graduation 73 will always be positioned correctly so that the isometric graduation can be used properly in the corresponding planes AC, AB or BC, respectively, as indicated by the axis symbols arranged near every one, and relative to every one, of the said edges.

The rotary index member consists of a straight strip 77 extending over the graduations 72 and 73 and provided with two opposite guides 78 that have the shape each of a circular segment. As shown more clearly in Fig. 5 the segments or guides 78 engage by means of projecting tongues 79 a corresponding circular groove 80 provided in edge 69. Thereby a correct rotary movement of member 77 around the center 81 of the opening 70 and of the concentric graduations 72, 73 is assured. The indexing edge 82 of member 77 extends through that central point 81. The provision of the rotary member 77 in this embodiment of the invention has the effect that edge 82 serves not only for drawing and gauging angular lines in any position of strip 77 relative to the center-zero line, but the outer extension of edge 82 at the end of strip 77 overlapping the graduations 72 and 73 is useful for determining the relation between isometric angles and regular angles, and vice versa.

Fig. 4 shows that concentric to the center 81 an index curve 83 is provided on the frame 71 between the central opening 70 and the graduation 73. This index curve 83 is designed in such a way that the radial distance of every point of its perimeter from the center 81 is equal to a constant multiplied by the ratio of foreshortening or lengthening affecting, through the isometric projection, a given distance extending at the corresponding angle contained between the center-zero line and the radius through the particular point. In the present instance, the curve 83 is an isometric ellipse. In line with the basic principles of the isometric system, the radial distances to the points of the curve that are situated in direction to the zero, 90° and 180° marks of the graduation, are equal to the chosen constant since in these selected directions there is neither foreshortening nor lengthening. The indexing edge 82 of the rotary member 77 is provided with one, or preferably two identical, graduations 84 which, in the present case, is a linear scale representing the above mentioned ratio on the same basis which underlies the construction of curve 83. Therefore, in any position of member 77, the actual ratio applying to that particular angular direction indicated on scale 73 may be read directly on graduation 84 at the point of intersection between the curve 83 and the index edge 82.

It is evident that the just described feature is of great value. Up to now the so-called non-axonometric lines, i. e. lines extending in directions not parallel with any one of the axonometric axes, could not be drawn to a definite scale nor scaled from a given axonometric drawing. Their length had to be determined indirectly by plotting or scaling their axonometric coordinates which is a very cumbersome and time-consuming operation. Now by means of the said index curve and the graduation on the index member the ratio in any angular direction within an axonometric plane can be quickly and correctly determined and the length at the scale of the drawing calculated by simple multiplication.

It is to be understood that the polar coordinates of the individual points of the index curve need not be determined by the product of a constant and the particular ratios, but instead of that constant a function may be used with the effect that then of course the graduation 84 is not of linear nature. This may be useful in the case of applying the same principle to dimetric or trimetric systems in which cases the curve, if designed by using a constant as basis, would become very oblong, but could be shortened by using a certain function.

In any case of a protractor that is provided with a rotary index member, it is advisable to arrange, along the index edge of such member, a linear graduation in units of length at the scale at which the particular drawing is to be drawn. Such a graduation has to extend only over that portion of said index edge which spans the opening in the frame of the protractor. In order to simplify the drawings such graduations are not shown in the figures described so far, but is shown in Fig. 6 which is described further below.

While the examples described with reference to Figs. 4, 6 and 8 are designed to deal with isometric problems only, it is obvious that they could as well be adapted analogously to dimetric and trimetric conditions. Such adaptations may either take care, by providing only one axonometric graduation and one index curve, of one of the various projections occurring in dimetric and trimetric systems, or they might comprise a number of different axonometric graduations and a corresponding number of index curves.

Fig. 6 illustrates a modified version of the protractor shown in Fig. 4. As stated above, in the case of certain dimetric or trimetric projections the shape of an index curve based on the use of a constant may become very inconveniently oblong. Instead of substituting a certain function for the constant, the index curve may be constructed in such a way that the radial distance of any one of its points is equal to the product of a constant and the logarithm of the ratio of foreshortening or lengthening occurring in the angular direction of that particular point.

In Fig. 6 a protractor is shown which is generally similar to the one illustrated by Fig. 4. Therefore the same numerals are applied to like parts. Besides an isometric graduation 73 the frame 71 is provided with a regular graduation 72, both concentric to the circular opening 70. A logarithmic index curve 104 is arranged concentric with and between graduations 72 and 73. The rotary index member 105 has an indexing edge 106 extending through the center 107 of rotation. This edge 106 is provided, in this example, with a regular inch graduation 108. In addition the index member 105 is provided with means resembling a slide rule. A movable strip 109 is slidably guided between two narrow strips 110 and 111 that are attached to the member 105 parallel with edge 106. The cross-section Fig. 5 shows the details of this arrangement. The movable strip 109 has an extension 112 towards one side which is provided with an indexing edge 113 of sufficient length to overlap the graduation 73 no matter how far the strip 109 is moved one way or the other within the range of this instrument. Besides the edge 113 always forms an extension of, or is in alignment with, the edge 106. On account of this, the member 105 may be set with its edge 106 in any angular position with respect to graduation 73 or 72. With reference to graduation 72 zero marks or index lines 114 are provided in line with edge 106 on the member 105. If desired a vernier 115 may be added to one of the marks 114.

The strip 110 is provided along its inner edge with a logarithmic graduation 116 based on the same constant or scale on which the curve 104 is constructed. This means that if, for instance, a unit of length "A" has been chosen to represent the logarithm of an actual dimension $R=10''$ on member 109 (scale 117) then the index curve 104 must be constructed so that, along its perimeter the radial center distance of every one of its points represents the logarithm of those coefficients which indicate the percentage of foreshortening or lengthening of the actual dimensions of lines at the particular angular position, said logarithms being plotted at the same scale which results in representing the logarithm of $R=10''$ by the chosen unit of length "A." It is advisable to extend the scale 116 downward beyond the value "1" and upward beyond the value "10" which latter, in fact, is used in the well known way also as "1." The strip 109 is provided along its edge facing the strip 110, with a logarithmic graduation 117 constructed on exactly the same scale as 116 so that these two graduations or scales may be used like an ordinary slide rule. The edge 113 of the slide extension 112 is provided with an index mark 118 in such a position that when the rotary member 105 is set to the angular position zero or 90° on scale 73, and when the two logarithmic graduations 116 and 117 are brought into complete alignment, the index 118 lines up exactly with the curve 104 at its point of intersection with edge 113.

In practice, the rotary member 105 may be set to any desired angular position and, in such position, the index 118 may be brought into register with the corresponding point of the curve 104. Then, except for the above-mentioned selected positions, the marks "1" of graduation 117 will indicate on the opposite scale 116 the ratio of foreshortening or lengthening, as the case may be, that applies to lines in the particular angular direction. However, this ratio need not be read. In the example illustrated the angular position is 45° on the isometric scale 73, therefore the ratio is 1.225. Suppose, however, a dimension of 3" is to be plotted along edge 106 in that direction, the user will read opposite the mark "3" of graduation 117 the value 3.675 on graduation 116. This would then be, in inches, the length of a line to be drawn along edge 106 by means of graduation 108 in order to represent correctly the dimension 3" at the given angle. The analogous procedure applies in reverse if the length of a non-isometric line in an isometric drawing is to be gauged or scaled. The slide member 109 is held and guided by bevel and/or groove engagement with strip 110 and another backing strip 111 attached thereto.

As shown by Figs. 8 and 9 in this embodiment of the invention the logarithmic curve 104 may be replaced by a groove 119 in which a guide pin 120 provided on the slide extension 112 instead of the index 118 would be automatically guided so as to control the lengthwise movement of slide 109 during a rotary movement of the member 105. Obviously, this version of the instrument facilitates and speeds up the operation and prevents errors.

While I have described a number of selected and preferred embodiments of my invention, I wish it to be understood that I do not wish to be limited to the details thereof as many variations and modifications, substitutions of equivalents and combinations of the described features may be found and used by those skilled in the art

What I claim is:

1. A protractor comprising a frame, means on the frame indicating a central point, an angular scale arranged thereon related to said central point adapted to indicate angles in such modified magnitudes as are determined by their projection in an axonometric system, said frame being provided, in addition to said angular scale, with at least one index curve on said frame related to said angular scale, said index curve being determined at every point of its perimeter by its being situated on a radial line from said central point to a point of said angular scale and at a radial distance from said central point equal to a constant multiplied by the ratio of foreshortening or lengthening affecting through the particular projection a given distance extending at the corresponding angle, with the protractor in a position predetermined for one plane of the projected object, said frame being provided with an indexing member adapted to be rotated with respect to said frame and in a plane parallel with that of the frame, the center of rotation coinciding with said central point of said angular scale, said member being provided with an index having at least one extended portion related to the center of rotation and to said scale so as to be adapted to measure and indicate angles one leg of which is a line from said central point to a point of said scale; said rotatable member being also provided, along its index, with a graduation adapted to intersect, during the rotation of said member, with said index curve and to indicate, in any angular position the ratio of foreshortening or lengthening applying to that angular position.

2. A protractor comprising a frame, means on the frame indicating a central point, an angular scale arranged thereon related to said central point adapted to indicate angles in such modified magnitudes as are determined by their projection in an axonometric system, said frame being provided, in addition to said angular scale, with at least one index curve on said frame related to said angular scale, said index curve being determined, at every point of its perimeter, by its being situated on a radial line from said central point to a point of said angular scale and at a radial distance from said central point equal to a constant multiplied by the logarithm of the ratio of foreshortening or lengthening affecting through the particular projection a given distance exending at the corresponding angle, with the protractor in a position predetermined for one plane of the projected object, said frame being provided with an indexing member adapted to be rotated with respect to said frame and in a plane parallel with that of said frame, the center of rotation coinciding with said central point of said scale, said member being provided with an index portion related to the center of rotation and to said scale so as to be adapted to measure and to indicate angles one leg of which is a line from said central point to a point of said scale, and the said index portion of said rotatable member being provided with a graduation in units of length; said rotatable member being also provided with a fixed logarithmic graduation and with a sliding member provided with a logarithmic graduation to the same scale, both logarithmic graduations being parallel with the said unit of length graduation, said sliding member being provided with an index mark adapted to be brought into coincidence with the intersection of said curve with the line connecting the said central point with the corresponding point of the said related modified angular graduation, so that in any angular position of the said rotatable member the index of the slide member may be aligned with the pertaining point of said index curve in order to set thereby the slide member and thus its logarithmic graduation, with respect to the fixed logarithmic graduation, to the ratio between original lengths and their counterparts in the pertaining projection, whereby the projected length may be read from the fixed logarithmic graduation.

3. A protractor as specified in claim 2, in which the index line in the form of a logarithmic curve is an edge of any kind including that of a groove provided on said frame, and the index mark on the slide member comprises means adapted to be guided along said edge on a path equivalent to and conforming with said logarithmic curve while said rotatable member is brought into various angular positions with respect to said frame.

PAUL F. BOEHM.

REFERENCES CITED

The following references are of record in the file of this patent:

UNITED STATES PATENTS

| Number | Name | Date |
| --- | --- | --- |
| D. 141,882 | Matson | July 31, 1945 |
| 570,977 | Belcher | Nov. 10, 1896 |
| 796,417 | Enberg | Aug. 8, 1905 |
| 1,422,925 | Carter | July 18, 1922 |
| 1,461,335 | Vosler | July 10, 1923 |
| 1,561,462 | Cram | Nov. 17, 1925 |
| 1,682,035 | Clark | Aug. 28, 1928 |
| 1,723,517 | McFadden | Aug. 6, 1929 |
| 2,039,333 | Musham | May 5, 1936 |
| 2,331,298 | Bennett | Oct. 12, 1943 |
| 2,398,143 | Jaediker | Apr. 9, 1946 |
| 2,422,745 | Ost | June 24, 1947 |

FOREIGN PATENTS

| Number | Country | Date |
| --- | --- | --- |
| 563,318 | Great Britain | Aug. 9, 1944 |
| 526,005 | Great Britain | Sept. 9, 1940 |
| 598,911 | Germany | June 21, 1934 |
| 379,984 | Germany | Sept. 1, 1923 |
| 352,988 | Italy | Oct. 1, 1937 |
| 389,995 | France | July 17, 1908 |
| 488,874 | France | Aug. 1, 1918 |

OTHER REFERENCES

Pages 80, 81, 132, 134 of Aero Digest, July 1, 1944, containing an article entitled "Photography Simplifies Trimetric Drawing Technique," by W. G. Wilkinson and H. C. Bartholomew.

Pages 147 to 152 and 196 of Machine Design, vol. 17, February 1945, containing an article entitled "Trimetric Drawing—Its Theory and Technique," by G. F. Bush.

Treatise on Isometrical Drawing by T. Sopwith, pp. 95–98 and 136 to 138 and plates XI and XVI. A. D. 1838.

"A Treatise on Projection," by P. Nicholson, London 1837, pp. 120–123, plates 48 and 49.

Page 277 of catalogue of Eugene Dietzgen Co., 218 E. 23rd St., New York, N. Y.